J. B. Stoner,
Flood Gate.
No. 69,860.   Patented Oct. 15, 1867.
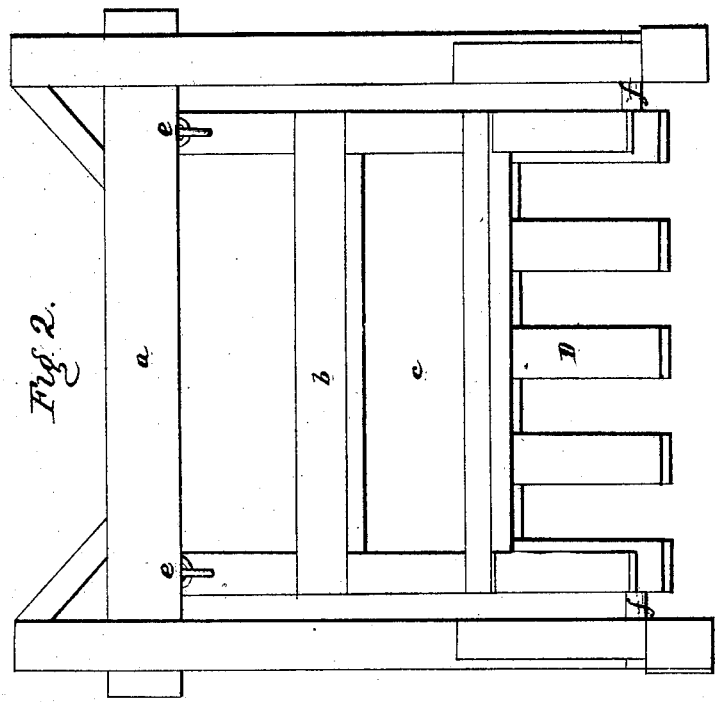
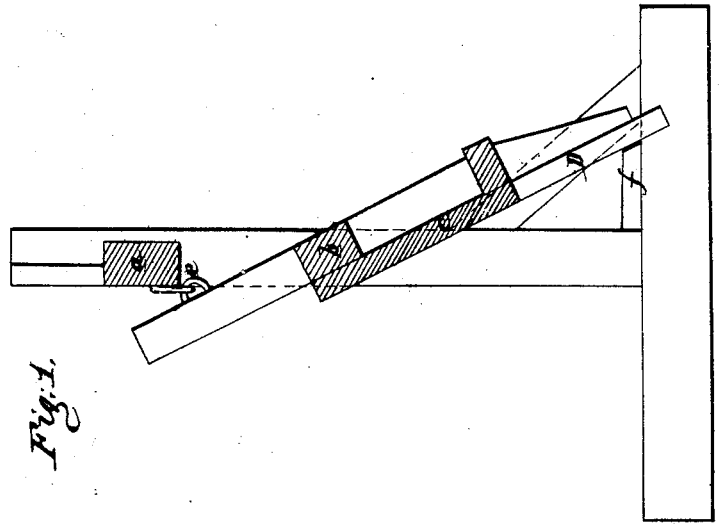
Witnesses                                Inventor
                                         John B. Stoner

United States Patent Office.

JOHN B. STONER, OF LACON, ILLINOIS.

Letters Patent No. 69,860, dated October 15, 1867; antedated October 1, 1867.

IMPROVEMENT IN FLOOD-GATES.

*The Schedule referred to in these Letters Patent and making part of the same.*

TO WHOM IT MAY CONCERN:

Be it known that I, JOHN B. STONER, of the town of Lacon, in the county of Marshall, and State of Illinois, have invented a new and useful Improvement in Flood-Gates; and I do hereby declare the following is a full, clear, and exact description of the construction and operation of the same, reference being had to the annexed drawings, making a part of this specification, in which—

Figure 1 represents an end view, and

Figure 2 a perspective view thereof.

$a$ represents a cross-beam, made fast upon its bearings at both ends upon upright posts or other device. $b$ represents the gate, made with closed joints in the part marked $c$, to within a short distance of the ordinary water-mark. Alternately the pieces forming the body of the gate extend into the water, as shown at $d$, forming escapes for the water. The gate is swung by means of staple-hinges in the upper beam at $e\ e'$. The staples are fastened on the edge or face of the beam $\infty$ which faces the source of the stream, and the gate rests upon the blocks $f f'$, at an inclination bearing from the same direction.

The object of having the gate $b$ made solid in the part marked $c$ is that a smooth and compact surface may be presented to the action of drift striking against it when the stream is swollen, thereby lessening the liability of injury to the gate by that cause, and by hanging the gate as above described, a less opening is occasioned at the bottom, and also throws its pressure upon the rests at $f f$, in this way securing a gate always shut by its own weight during the time of low water.

What I claim as my invention, and desire to secure by Letters Patent, is—

A flood-gate with escapes reaching below, and with solid front above the escapes, and swung upon the cross-beam by means of staple-hinges placed in the edge or side of the beam $a$ facing the source of the stream, the gate resting at an inclination upon the bearings at $f f'$.

JOHN B. STONER.

Witnesses:
A. G. HEYBUNN,
H. A. HOLDEN.